United States Patent [19]

Dang et al.

[11] Patent Number: 4,924,493
[45] Date of Patent: May 8, 1990

[54] METHOD FOR MONITORING CALL SETUP COMMUNICATIONS

[75] Inventors: Mieu-Hong Dang; Jorge R. Taborga, both of Austin, Tex.

[73] Assignee: IBM Corporation, Armonk, N.Y.

[21] Appl. No.: 246,473

[22] Filed: Sep. 19, 1988

[51] Int. Cl.⁵ .......................................... H04M 11/00
[52] U.S. Cl. ...................................... 379/94; 379/96; 379/164; 379/372; 379/376; 370/110.3
[58] Field of Search ............... 379/94, 96, 98, 164, 379/263, 372, 376; 370/62, 110.3

[56] References Cited

U.S. PATENT DOCUMENTS 3,502,812  3/1970  Litofsky .............................. 379/376

FOREIGN PATENT DOCUMENTS 2033697  5/1980  United Kingdom ................ 379/263

Primary Examiner—Jin F. Ng
Assistant Examiner—Wing F. Chan
Attorney, Agent, or Firm—Andrew J. Dillon

[57] ABSTRACT

A method is disclosed for monitoring call setup communications between a communications station and a telecommunications network. A plurality of so-called "result codes," each consisting of a numeric prefix and an associated textual message, are transmitted from the telecommunications network in response to an attempted call setup. These result codes are screened at the communications station by matching numeric prefixes against a predetermined list of selected numeric prefixes and to eliminate irrelevant and/or redundant messages. Next, an alphanumeric display is utilized at the communications station to display in a user discernible manner all those messages indicative of the status of call setup information.

7 Claims, 2 Drawing Sheets 4,924,493

METHOD FOR MONITORING CALL SETUP COMMUNICATIONS

BACKGROUND OF THE INVENTION

1. Technical Field

This invention relates in general to telecommunications and in particular to a method for enhancing the establishment of communications between a communication station and a telecommunications network. Still more particularly, this invention relates to a method of effectively monitoring the establishment of call setup messages between a communication station and a telecommunications network.

2. Background Art

It is well known in the prior art to utilize computer program controlled telephone switching systems to interconnect individual telephone stations, digital terminals, personal computers and large main-frame computers. Such intercommunications may be utilized to provide voice and/or data communications. In a typical application, the telephone switching system is utilized to establish communication connections between two communication stations, both of which may include an associated computer facility connected to a communications pair. Thereafter, the operator generally utilizes a modem which converts digital signals output by a computer to analog signals suitable for transmission by the telephone system. Alternately, certain systems permit direct communication by digital signals over special communication pairs.

More recently, certain systems have been proposed which incorporate computer facilities which are directly connected to a communications pair. In such systems, the computer facility is utilized to emulate the functions of a telephone communication system. In this manner, the telephone communication station is no longer required for computer data call origination purposes.

In either of the two aforementioned systems, it is common during call setup for a multitude of command and information messages to be transmitted back and forth between a computer facility and a second computer facility, or a Private Branch Exchange (PBX). Such messages may be directed toward acknowledgement of selected parity, data rate, and other call parameters, as well as indications of the progress of the interconnection. Such messages may prove useful during initial setup of a communication system, or to troubleshoot the system to determine why a communications attempt has failed; however, the shear magnitude of message numbers may obscure the progress of the communications link and make it difficult for the casual operator to determine the progress of setup for an ordinary data call. Thus, it should be apparent that a need exists for a method which will provide the system operator with selected call progress information without overwhelming the operator with large amounts of information and/or data.

SUMMARY OF THE INVENTION

It is therefore one object of the present invention to provide an enhanced method of monitoring call setup communications.

It is another object of the present invention to provide an enhanced method of monitoring call setup communications which limits the number of messages transmitted to an operator.

It is yet another object of the present invention to provide an enhanced method of monitoring call setup communications which limits the number of messages transmitted to an operator to those messages which directly affect the success of a data call.

The foregoing objects are achieved as is now described. The method of the present invention monitors the transmission of so-called "result codes" from the telecommunications network to the communications station. Each result code preferably comprises a numeric prefix and an associated textual message which may be generated in response to an attempted call setup. The result codes are then screened at the communication station by matching numeric prefixes against a predetermined list of selected numeric prefixes to eliminate irrelevant and/or redundant messages. Next, an alphanumeric display at the communication station is utilized to display a user discernible message indicative of the status of call setup as indicated by the result code.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
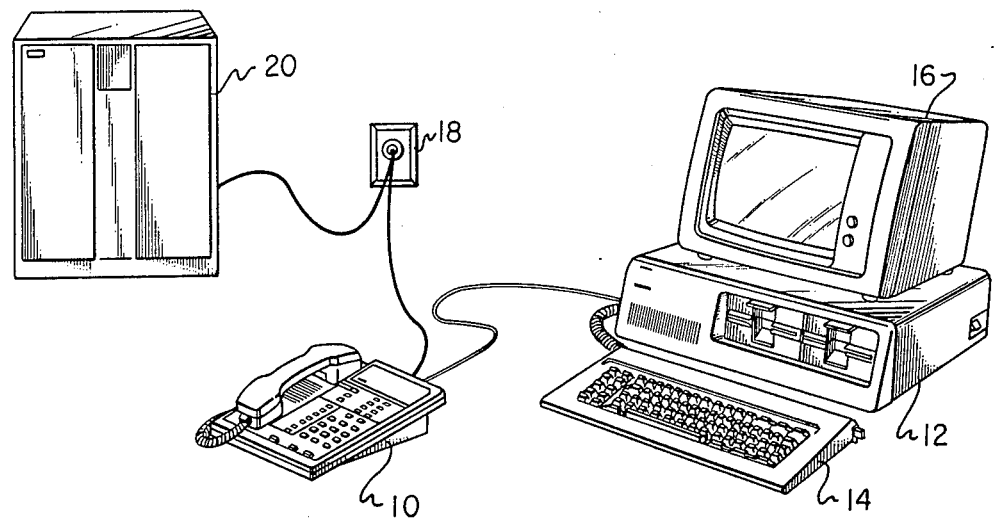
FIG. 1 depicts a pictorial representation of a communication system which may be utilized in accordance with the method of the present invention.

With reference now to the figures, and in particular with reference to FIG. 1, there is depicted a pictorial representation of a communication system which may be utilized in accordance with the method of the present invention. As may be seen, the communication system includes a telephone 10 which preferably permits both voice and data communication. Telephone 10 may be implemented utilizing any telephone having a data/telephony capability, such as the ROLMphone 244PC, manufactured by International Business Machines Corporation. Telephone 10 is coupled, via a standard EIA232D cable to a serial asynchronous port within computer 12.

Computer 12 within the depicted system is preferably provided by utilizing an IBM Personal Computer, an IBM Personal System/2 or other similar system. As those skilled in this art will appreciate, computer 12 generally includes both a keyboard 14 and a video display device 16, which may be utilized to allow operator input and to provide user discernible messages to an operator of the communication system depicted.

In the system illustrated, telephone 10 may be utilized for data communications in a manner very similar to that of a modem due to the fact that the ROLMphone 244PC will support the AT command set which is utilized in most modems. To permit such communication, telephone 10 is connected to a telecommunication system such as a Private Branch Exchange (PBX) 20 which may be implemented utilizing the ROLM Computerized Branch Exchange (CBX). This connection is preferably made via a distributed wiring system which includes a plurality of telephone outlets 18.

Figure 2:
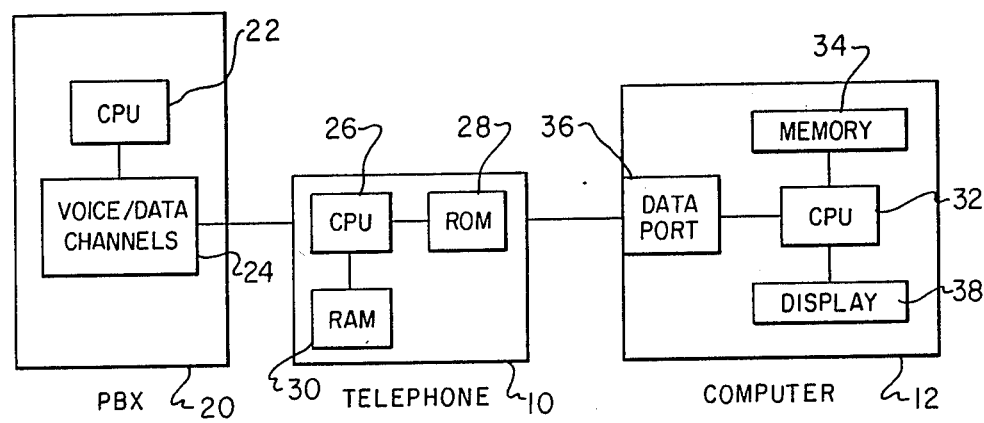
FIG. 2 depicts a high level block diagram of the communication system of FIG. 1.

Referring now to FIG. 2, there is depicted a high level block diagram of the communication system depicted in FIG. 1. As may be seen, telephone 10 preferably includes a Central Processing Unit (CPU) 26 as well as both Read-Only-Memory (ROM) 28 and Random-Access-Memory (RAM) 30, which may be utilized in a manner well known in the art to store the control sequences utilized by Central Processing Unit 26 to operate telephone 10 in accordance with the method of the present invention. In the depicted embodiment of the present invention, Central Processing Unit 26 is preferably implemented utilizing a Motorola 68000 processor. Of course, those skilled in this art will appreciate that telephone 10 will also include circuitry which supports a databus as well as the telephone and audio sections of telephone 10.

As is typical of communication systems of this type, Private Branch Exchange 20 also includes a Central Processing Unit 22 which may be utilized to control the activity of voice/data channels 24. Finally, computer 12 also includes a Central Processing Unit 32 which is coupled, in a manner well known in the computer art, to memory 34, data port 36 and display driver 38. Of course, memory 34 will generally consist of a combination of Read-Only-Memory and Random-Access-Memory as well as those types of memory typically supported on magnetic media such as floppy disk.

Figure 3:
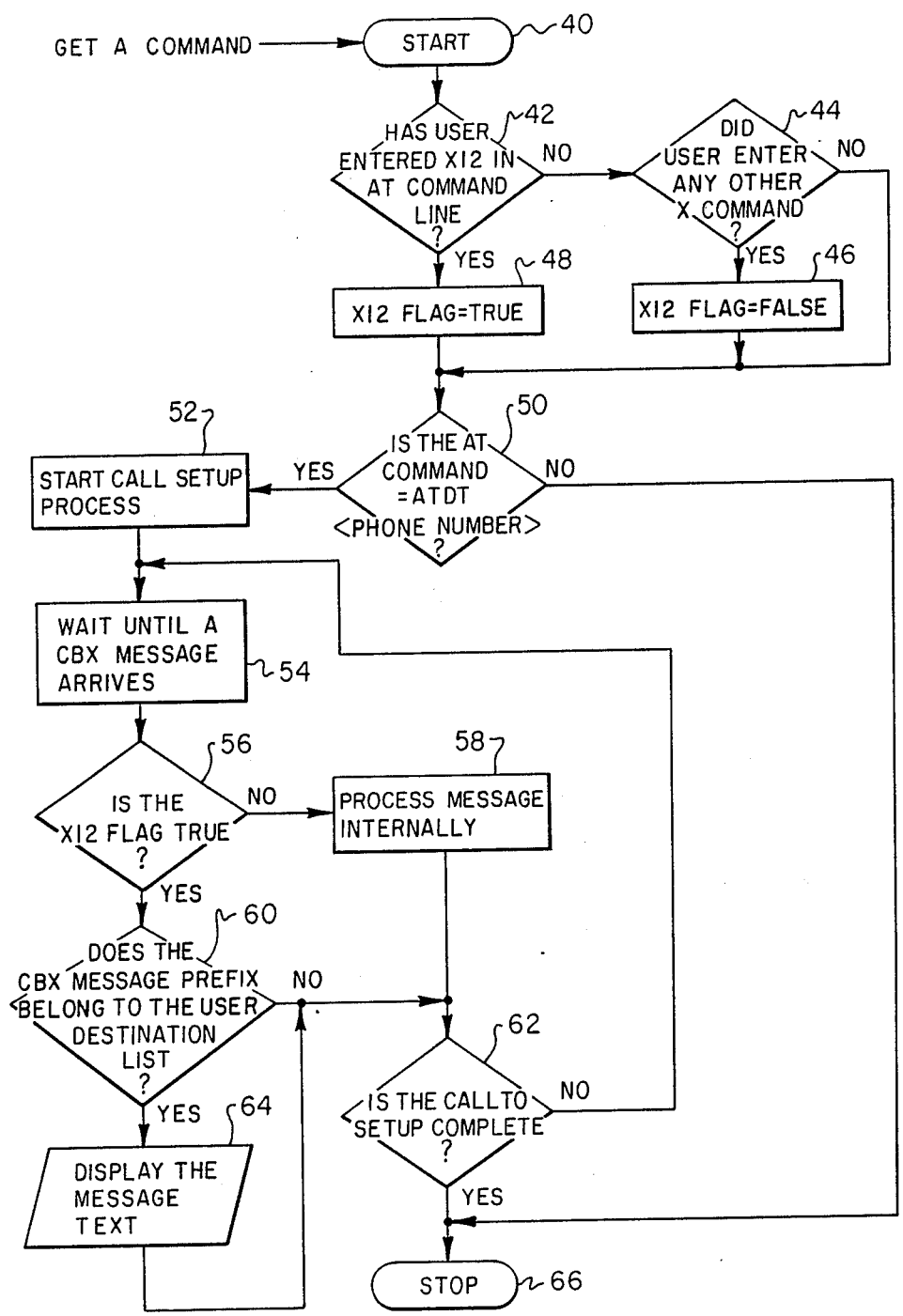
FIG. 3 depicts a logic flow chart illustrating the method of the present invention.

With reference now to FIG. 3, there is depicted a logic flow chart illustrating the method of the present invention. As is illustrated, the method of the present invention begins at block 40 where a command is received from the operator of computer 12. Such commands are coupled, via data port 36, to telephone 10 (see FIG. 2). Central processing unit 26 within telephone 10 is programmed to respond to so-called "AT" modem commands and determines, as depicted in block 42, whether or not the user has entered an "X12" command within the AT command line. The X12 command is the command which is utilized, in conjunction with the method of the present invention, to signify the desire of the operator to limit the messages sent by the telecommunications network to the operator to those messages indicative of selected call setup information.

In the event the operator has entered an AT command which does not include the X12 command, block 44 is utilized to determine whether or not the operator has elected to include a different X command which may be utilized to further modify the number and content of messages to be received by the operator. In the event block 44 determines that the operator has entered an AT command which does not include an X command, the process passes to block 50. If the operator has entered an X12 command within the AT command line, or another X command, as determined by blocks 42 or 44 then blocks 46 and 48 are utilized to set a flag indicative of the state of the X12 command.

Next, block 50 is utilized to determine whether or not the AT command received by Central Processing Unit 26 within telephone 10 is an ATDT command. The ATDT command, in accordance with the interpretation of these commands as utilized by the ROLMphone 244PC is utilized to signify the desire of the operator to make a data call. If the command received is not an ATDT command, the process passes to block 66 and terminates. However, if the command received is an ATDT command, block 52 illustrates the beginning of the call setup process. Thereafter, the system waits until a message arrives from the Computerized Branch Exchange (CBX), as depicted in block 54.

The format utilized for messages from the telecommunications network, in accordance with the method of the present invention, includes a numeric prefix associated with a textual message which may be utilized to provide the operator with useful information regarding the status of the system at any given point in time. After a message has arrived from the telecommunications network, block 56 is utilized to determine the state of the X12 flag. If the operator has not selected a limited communication option, as indicated by the omission of an X12 command, block 58 depicts the processing of the message internally in accordance with normal procedures. This process includes all of those response and display techniques typically utilized with a message from the telecommunications network. Next, block 62 is utilized to determine whether or not the call setup is complete. If so, the process terminates, as illustrated in block 66. If not, the process returns to block 54 to await a second or subsequent message from the telecommunications network.

Returning to block 56, in the event the operator has selected a limited communication option, as indicated by the inclusion of an X12 command within the AT command line, block 60 illustrates the screening process whereby the numeric prefix associated with each result code or message from the telecommunications network is matched against those prefixes listed in preselected list. If the numeric prefix of a particular result code or message does not match a preselected message, the process proceeds to block 62 to determine whether or not the call setup is complete, without taking further action. In the event the numeric prefix associated with a particular message received from the telecommunications network does match one of the list of numeric prefixes contained within a preselected user destination list, then block 64 illustrates the displaying of the message text associated with that result code in a user discernible format.

In accordance with the method illustrated in the logic flow chart of FIG. 3, it may be appreciated that by entering an X12 command in the AT command line the operator may thus limit the number of messages from the telecommunications network which will result in a user discernible display to those messages which match a predetermined criterion which has been selected to permit the operator to review only those messages directed to the progress of the data call. This condition will continue until such time as the operator enters another command altering this condition. In the depicted embodiment of the present invention, these messages include the following:

| NUMERIC PREFIX | MESSAGE DESCRIPTION |
| --- | --- |
| #02 | Calling (Number) |
| #03 | Queuing |
| #04 | Call Complete |
| #07 | Rate Error |
| #08 | Parity Error |
| #81 | Busy |
| #91 | Parameter Error |
| #92 | Call Configuration Error |
| #93 | Call External Error |
| #95 | Time Out Error |

-continued

| NUMERIC PREFIX | MESSAGE DESCRIPTION |
|---|---|
| #96 | Does Not Answer |

In this manner, the operator only receives those messages which are clearly indicative of the status of the call setup.

While the invention has been particularly shown and described with reference to a preferred embodiment, it will be understood by those skilled in the art that various changes in form and detail may be made therein without departing from the spirit and scope of the invention.

We claim:

1. A method of monitoring call setup communications for data communication between a communication station and a telecommunications network, said method comprising the steps of:
   transmitting a plurality of digital result codes corresponding to multiple command and information messages from said telecommunication network to said communication station in response to an attempted call setup for data communications;
   selecting from said plurality of digital result codes received at said communication station only those particular digital result codes indicative of selected call setup information; and
   displaying at said communication station a user discernible indication of said selected call setup information.

2. The method of monitoring call setup communications according to claim 1 wherein said step of selecting from said plurality of digital result codes received at said communication station only those particular digital result codes indicative of selected call setup information further comprises the step of screening out all digital result codes not indicative of the progress of call setup.

3. The method of monitoring call setup communications according to claim 1 wherein said step of selecting from said plurality of digital result codes received at said communication station only those particular digital result codes indicative of selected call setup information further comprises the step of screening out all redundant digital result codes indicative of the progress of call setup.

4. The method of monitoring call setup communications according to claim 1 wherein said communication station includes an alphanumeric display and wherein said step of displaying a user discernible indication of said selected call setup information comprises the step of displaying an alphanumeric message.

5. The method of monitoring call setup communications according to claim 1 wherein each of said plurality of digital result codes is transmitted in conjunction with a digitally encoded numeric prefix.

6. A method for monitoring call setup communications according to claim 5 wherein said step of selecting from said plurality of digital result codes received at said communication station only those particular digital result codes indicative of selected call setup information comprises the step of comparing each digitally encoded numeric prefix associated therewith with a predetermined list of numeric prefixes.

7. A method for monitoring call setup communications according to claim 6 wherein said step of displaying at said communication station a user discernible indication of said selected call setup information comprises the step of displaying a user discernible indication associated with each digital result code having a digitally encoded numeric prefix within said predetermined list of numeric prefixes.

* * * * *